(12) United States Patent
Stowasser

(10) Patent No.: US 12,288,310 B2
(45) Date of Patent: Apr. 29, 2025

(54) IMAGING WITH ASYMMETRICAL CONTRAST AMPLIFICATION

(71) Applicant: Siemens Healthcare GmbH, Erlangen (DE)

(72) Inventor: Boris Stowasser, Erlangen (DE)

(73) Assignee: Siemens Healthineers AG, Forchheim (DE)

( * ) Notice: Subject to any disclaimer, the term of this patent is extended or adjusted under 35 U.S.C. 154(b) by 530 days.

(21) Appl. No.: 17/573,727

(22) Filed: Jan. 12, 2022

(65) Prior Publication Data

US 2022/0230286 A1 Jul. 21, 2022

(30) Foreign Application Priority Data

Jan. 15, 2021 (DE) ...................... 10 2021 200 365.6

(51) Int. Cl.
*G06T 5/50* (2006.01)
*G06T 7/00* (2017.01)
*G06T 15/08* (2011.01)

(52) U.S. Cl.
CPC .............. *G06T 5/50* (2013.01); *G06T 7/0014* (2013.01); *G06T 15/08* (2013.01); *G06T 2207/10116* (2013.01); *G06T 2207/30101* (2013.01)

(58) Field of Classification Search
CPC ........... G06T 17/00; G06T 2207/30101; G06T 2211/421; G06T 15/00; G06T 2207/20024
See application file for complete search history.

(56) References Cited

U.S. PATENT DOCUMENTS

| 6,763,129 | B1 | 7/2004 | Honda et al. |
| 8,411,987 | B2* | 4/2013 | Han ........................ G06T 5/90 |
| | | | 345/20 |
| 11,771,390 | B2* | 10/2023 | König .................. A61B 6/5205 |
| | | | 382/128 |
| 2010/0061603 | A1 | 3/2010 | Mielekamp et al. |
| 2010/0172474 | A1* | 7/2010 | Vogt ...................... G06T 7/0016 |
| | | | 378/98.12 |
| 2011/0038458 | A1 | 2/2011 | Spahn |
| 2020/0372615 | A1 | 11/2020 | Ida |

FOREIGN PATENT DOCUMENTS

| DE | 102007051479 A1 | 5/2009 |
| DE | 102009037243 A1 | 2/2011 |
| DE | 102013205537 A1 | 3/2014 |

OTHER PUBLICATIONS

Buemi, Antonio, et al. "Adaptive sharpening with overshoot control." International Conference on Image Analysis and Processing. Springer, Berlin, Heidelberg, 2009. pp. 863-872.

* cited by examiner

*Primary Examiner* — Ian L Lemieux
*Assistant Examiner* — Sebastian-Sy Vuchi Ngo
(74) *Attorney, Agent, or Firm* — Lempia Summerfield Katz LLC

(57) ABSTRACT

In an imaging method an image is generated by an imaging device that includes a vessel structure of an object to be imaged and/or a device arranged in the object. A local asymmetrical contrast amplification algorithm is applied to the image to generate a filtered image that is displayed by a display device.

16 Claims, 4 Drawing Sheets

IMAGING WITH ASYMMETRICAL CONTRAST AMPLIFICATION

CROSS REFERENCE TO RELATED APPLICATIONS

This patent document claims the benefit of DE 102021200365.6 filed on Jan. 15, 2021, which is hereby incorporated in its entirety by reference.

FIELD

Embodiments relate to an imaging method where an image is generated by an imaging device and includes a vessel structure of an object to be imaged and/or a device arranged in the object.

BACKGROUND

Modern imaging methods, for example X-ray-based imaging methods, for example fluorescence-aided X-ray-based methods, are sometimes employed to support interventions. In this case a tool or other device introduced or inserted into the object to be examined during the intervention may be imaged and tracked within the object, for example in a vessel structure of the object.

To enable as precise as possible a trackability of the device in respect of the vessel structure and thus as exact as possible a guidance of the device within the object, it is desirable to achieve as high as possible an image quality. For example, in the context of X-ray-based imaging methods it may be difficult to recognize the device clearly and to differentiate the device clearly from other components of the image, for example representations of tissue structures or bone structures or else of the vessel structure. The same applies for the recognizability of the vessel structure compared to other tissue or similar.

BRIEF SUMMARY AND DESCRIPTION

The scope of the present invention is defined solely by the appended claims and is not affected to any degree by the statements within this summary. The present embodiments may obviate one or more of the drawbacks or limitations in the related art.

Embodiments provide an improved concept for imaging, for example for X-ray-based imaging, by which the image quality of the resulting image may be improved.

Embodiments are based on the idea of applying a local asymmetrical contrast amplification algorithm to an image, that includes a device and/or a vessel structure of the object arranged in the object to be imaged, and of displaying the filtered image to a user.

Embodiments provide an imaging method. An image is generated by an imaging device that includes a vessel structure of an object to be imaged and/or a device arranged in the object, for example a device arranged in the vessel structure. By an arithmetic unit, for example of the imaging device, a local asymmetrical contrast amplification algorithm is applied to the image to generate a filtered image. The filtered image is displayed to a user of the imaging device by a display device, for example of the imaging device.

The imaging device may for example include an imaging modality and the arithmetic unit. The arithmetic unit may also be part of the imaging modality. The imaging modality may for example be configured as an X-ray imaging device, and correspondingly may therefore include an X-ray source and an X-ray-sensitive sensor.

The imaging method may for example be configured as a subtraction angiography method. The image then corresponds for example to a superimposition of a mask, also referred to as a reference image, with an examination image.

The image for example contains a plurality of image points or pixels, that are assigned to corresponding detectors of a detector array of the sensor. In the case of digital X-ray imaging the sensor for example includes an array, for example a two-dimensional array, of photodiodes, that detect the X-ray quanta emitted by the X-ray source and penetrating at least in part through the object and may generate corresponding detector signals. Each image point may correspondingly be assigned a signal intensity. The signal intensity may be encoded for the visual representation for example as a gray-scale value or other brightness value, including as an intensity value. Each image point therefore has a corresponding intensity value.

The local contrast amplification algorithm may for example be understood as a local digital filter algorithm. The contrast amplification algorithm therefore for example carries out the processing of the corresponding input information or input images pixel by pixel or region by region.

The local contrast amplification algorithm is configured as an asymmetrical contrast amplification algorithm. In other words, the contrast amplification algorithm works asymmetrically in respect of a local intensity threshold value. In other words, intensity values above the local intensity threshold value are influenced neither in the identical manner nor in an exactly inverted manner by the contrast amplification algorithm, as is the case for intensity values below the local intensity threshold value.

Thanks to the use of the contrast amplification algorithm the recognizability of the device and/or of the vessel structure in the filtered image may be improved compared to the unfiltered image and thus ultimately the image quality. Thanks to the asymmetrical configuration of the contrast amplification algorithm, image regions that are darker compared to the local surrounding area are enhanced more strongly than are image regions that are brighter compared to the local surrounding area or vice versa. As a result, relevant image regions, for example those that correspond to the device and/or the vessel structure, are enhanced particularly strongly, whereas less relevant image regions are not enhanced, or are enhanced less strongly.

In an embodiment, intensity values below a local intensity threshold value are reduced thanks to the use of the contrast amplification algorithm and/or intensity values above the local intensity threshold value are increased. The contrast amplification algorithm in this case works asymmetrically in respect of the local intensity threshold value.

For example, the intensity values below the local intensity threshold value may be reduced and the intensity values above the local intensity threshold value are neither reduced nor increased, or are in essence neither reduced nor increased. Alternatively, the intensity values above the local intensity threshold value may be increased by a degree of increase, wherein the increase of an intensity value above the local intensity threshold value is less strongly pronounced than the reduction of an intensity value below the local intensity threshold value that is equally far away from the intensity threshold value; the increase thus takes place by a degree of increase that is less compared to the degree of reduction. This results in the asymmetrical effect of the contrast amplification algorithm.

This for example means that devices that include a more radio-opaque material than the surrounding area of the respective image point, for example the tissue of the object, are more strongly enhanced.

In the case of devices that are less radio-opaque compared to the surrounding tissue, the asymmetrical effect of the contrast amplification algorithm may be inversely pronounced.

In an embodiment a blurred input image is generated by the arithmetic unit for the application of the contrast amplification algorithm based on an input image dependent on the image. By subtracting the blurred input image from the input image, a contrast image is generated and by superimposing the input image with the contrast image or with an image dependent on the contrast image a contrast-amplified image is generated.

The contrast-amplified image may be a result of the contrast amplification algorithm.

The input image dependent on the image may be the image itself or a preprocessed variant of the image. The input image may also be a result of a further filter algorithm.

A low-pass filter, a local Gaussian filter, a box kernel filter or a multiscalar filter may be used for the blurring, that may also be referred to as softness. Since the blurred input image corresponds to a variant of the input image with reduced contrast, subtracting the blurred input image from the input image produces the contrast image, in which the parts of the input image that to a certain extent give rise to its contrast have been extracted. In other words, the parts of the input image that are not present in the blurred input image correspond to the contrast image.

The contrast-amplified image may for example be generated as the sum of the input image and of the contrast image or as the sum of the input image and of the image dependent on the contrast image. As a result, the contrasts of the input image are in any case partially amplified. Ultimately this results in better recognizability of the device and/or of the vessel structure in the filtered image.

In an embodiment the contrast image is locally asymmetrically modified by the arithmetic unit in respect of a local intensity threshold value and the contrast-amplified image is generated by superimposing the input image with the modified contrast image.

The characterization of the modification as asymmetrical may in this case for example be understood such that the modification in respect of the intensity threshold value takes place neither symmetrically nor antisymmetrically.

The local intensity threshold value may differ for example for different image points of the input image or input image point regions of the input image. For example, the local intensity threshold value may be determined by the arithmetic unit as an average intensity value of a predefined surrounding area of an image point of the input image. To apply the contrast amplification algorithm, for example, all image points of the input image are taken into account, a respective intensity threshold value is calculated as a corresponding average intensity value and is used as the basis for the asymmetrical modification of the contrast image.

In an embodiment, an intensity value of an image point of the contrast image is reduced by the arithmetic unit for the modification of the contrast image, if the intensity value of the image point of the contrast image is smaller than the intensity threshold value. Alternatively, or additionally, the intensity value of the image point of the contrast image may be increased for the modification of the contrast image by the arithmetic unit, if the intensity value of the image point of the contrast image is greater than the intensity threshold value.

However, in both cases the reduction and/or increase take place asymmetrically in respect of the intensity threshold value. For example, the described reduction or increase in the intensity value of the image point may be carried out for all image points of the contrast image, in order to generate the modified contrast image.

An increased intensity value corresponds to a brightening of the corresponding image point and a reduction in the intensity value of a darkening of the image point. Because the image points with intensity values that are smaller than the intensity threshold value are reduced, darker parts of the contrast image tend to be darkened further. Brighter parts of the contrast image are not brightened further or are brightened less strongly than the dark parts are darkened. More radio-opaque devices are more strongly enhanced in the modified contrast image and accordingly are also more strongly enhanced in the contrast-amplified image.

If tools or the like that are less radio-opaque compared to the surrounding tissue are used, the modification of the contrast image may include the brightening of the brighter regions of the contrast image and no darkening of the darker regions or a less strong darkening.

The asymmetrical characteristic of the contrast amplification algorithm means that only the components of the device image that are of particular interest are amplified, for example the device and/or the vessel structure.

In an embodiment a reference image and an examination image are generated by the imaging device. The examination image represents the device arranged in the object and the reference image does not represent the device arranged in the object. The image is generated by the arithmetic unit as a subtraction image of the examination image and of the reference image.

The image hence includes the device and if appropriate may also include the vessel structure. If a contrast agent is employed neither for the generation of the reference image nor for the generation of the examination image, the device does not image the vessel structure or images it only in a highly attenuated manner.

In an embodiment the examination image is generated by using a contrast agent, and may therefore also be referred to as a contrast agent image. The reference image is generated without using the contrast agent and is for example also referred to as a mask image.

For example, the examination image may therefore be generated using the contrast agent, if the device is arranged in the object and the reference image may be generated without using the contrast agent, before the device is arranged in the object; it therefore for example does not image the device.

The generation of the subtraction image may also include a registration of the examination image with the reference image.

The subtraction image may therefore be generated in that for example the reference image and the examination image are subtracted from one another or registered to one another and thereafter subtracted from one another. The subtraction may take place pixel by pixel.

The reference image in this case for example represents a surrounding area of the device, for example the vessel structure and a surrounding area of the vessel structure. The examination image likewise represents the vessel structure and the surrounding area of the vessel structure, wherein however thanks to the application of the contrast agent an image contrast is increased between regions that correspond to the vessel structure, and other regions compared to the reference image. Thanks to the generation of the subtraction image the parts of the examination image that are not enhanced by the application of the contrast agent are removed by the subtraction of the reference image or are in any case attenuated. The resulting subtraction image hence represents the vessel structure particularly clearly, whereas the other structures and/or tissue parts in the surrounding area are not represented or are only represented in a highly attenuated manner. As a result, the recognizability of the vessel structure in the image and ultimately in the filtered image is improved.

The examination image and the reference image may for example correspond to respective X-ray recordings.

For example, the examination image and the reference image are recorded with identical imaging parameters of the imaging modality, for example of the X-ray source and of the sensor. This means that artifacts in the subtraction image may be reduced or prevented.

In an embodiment, the reference image is generated by the imaging device without using the contrast agent and the examination image is generated using the contrast agent. The examination image represents the vessel structure. The image is generated by the arithmetic unit as a subtraction image of the examination image and of the reference image.

For example, neither the reference image nor the examination image may image the device.

Three variants of subtraction images are therefore provided. In all three variants the reference image does not image the device. Likewise, the generation of the reference image takes place in all three variants without using the contrast agent.

In a first variant no contrast agent is used for the generation of the examination image and the examination image includes the device. The subtraction image represents only the device. This may be advantageous for example for checking a status of the device. In a second variant the contrast agent is used for the generation of the examination image and the examination image includes the device. The subtraction image represents both the device and the vessel structure. This may be advantageous for example for determining the position of the device relative to the vessel structure. In a third variant the contrast agent is used for the generation of the examination image and the examination image does not image the device. The subtraction image represents only the vessel structure.

In an embodiment a plurality of further images is generated by the imaging device. Each of the further images includes the vessel structure and/or the device arranged in the object. The image and each of the further images is generated with different recording angles in each case.

In certain embodiments, the examination image and the reference image are in this case generated if appropriate with the same recording angle, in order to generate the image.

In other words, the recording angle is gradually changed in order to generate the image and the further images correspondingly. The recording angle may in this case correspond to an angle of a recording direction in three-dimensional space with respect to a predefined reference axis. The recording direction may in this case for example be parallel to a straight line that connects the X-ray source to the detector array of the sensor.

The changeability of the recording angle may for example be implemented by using a C-arm X-ray imaging modality.

In an embodiment a three-dimensional reconstruction is generated by the arithmetic unit on the basis of the image and on the basis of the plurality of further images. The reconstruction is displayed to the user by the display device and/or by a further display device of the imaging device.

In an embodiment the contrast amplification algorithm is applied to each of the further images by the arithmetic unit in order to generate a respective further filtered image. The further filtered images are displayed to the user by the display device.

The filtered image and the further filtered images are for example displayed individually, i.e., without their being processed with one another in the sense of a three-dimensional reconstruction.

The filtered image or the further filtered images provide users with, in addition to the three-dimensional reconstruction, a valuable opportunity to orient themselves during the intervention or examination.

Since the undistorted image and the undistorted further images are needed for the reconstruction, and the reconstruction is therefore for example generated independently of the filtered image and independently of the further filtered images, the—if appropriate additional—direct display of the filtered image or of the further filtered images offers a significant added value for the user.

In certain embodiments the reconstruction is hence displayed additionally to, for example simultaneously with, the filtered image and/or the further filtered images, for example next to one another.

As a result, the diverse information that the reconstruction and the filtered image or the further filtered images contain may be acquired particularly effectively and efficiently by the user.

In an embodiment the filtered image and the further filtered images are displayed one after the other, for example by the display device, so that at any time either the filtered image or precisely one of the further filtered images is displayed.

Thus, a chronologically dynamic representation of the filtered image and of the further filtered images may be achieved, for example in the sequence of the set recording angles. The image rate of the representation may in this case be predefined for example by the user. Thus, an effectively three-dimensional representation may therefore be achieved, without carrying out an additional three-dimensional reconstruction.

In an embodiment a corresponding further reference image and a corresponding further examination image for each further image of the plurality of further images. The further reference images in each case do not represent the device arranged in the object. The respective further image is generated by the arithmetic unit as a subtraction image of the respective examination image and of the respective reference image.

The further examination images may be generated with or without the use of the contrast agent, as explained in respect of the examination image. Depending on the form of embodiment the further examination images may or may not image the device, as explained in respect of the examination image.

The respective examination image used for the generation of one of the further images and the further reference image used for the generation of the same further image are in this case for example generated with the same recording angle.

For example, the reference image and the further reference images may initially each be generated without using the contrast agent and without imaging the device. The examination image and the further examination images may subsequently each be generated by using the contrast agent and/or in the case of a device arranged in the object. In the case of both passes the recording angle is changed or passed through in the same manner, in order to obtain correspondingly suitable pairs for the subtractions.

In an embodiment an imaging device is provided that contains an imaging modality. The imaging device, for example the imaging modality, also includes an arithmetic unit. The imaging modality is configured to generate at least one sensor dataset that relates to a vessel structure of an object to be imaged and/or a device arranged in the object, for example in the vessel structure. The arithmetic unit is configured to generate, on the basis of the at least one sensor dataset, an image that includes the vessel structure and/or the device. The arithmetic unit is configured to generate a filtered image by the application of a local asymmetrical contrast amplification algorithm to the image. The imaging device additionally has a display device that is coupled to the arithmetic unit for the display of the filtered image to a user of the imaging device.

The display device for example includes a display or a monitor for the display of the filtered image. The display device may to this end be correspondingly controlled by the arithmetic unit.

For example, the at least one sensor dataset may include the examination image or the arithmetic unit may be configured to generate the examination image on the basis of the at least one sensor dataset. For example, the at least one sensor dataset may also include the reference image or the arithmetic unit may be configured to generate the reference image on the basis of the at least one sensor dataset.

The imaging modality is for example configured as an X-ray imaging modality, for example as a digital X-ray imaging device, for example as a C-arm X-ray imaging modality. The imaging modality therefore for example includes an X-ray source and a sensor unit. The sensor unit may for example include a detector array, for example a two-dimensional detector array, of optical detectors, for example photodiodes, that may generate the at least one sensor dataset.

Embodiment of the imaging device follow from the various forms of embodiments of the imaging method and vice versa. For example, the imaging device may be configured to carry out a method or may carry out an imaging method as described herein.

In an embodiment, a computer program product with commands is provided. On execution of the commands by an imaging device, for example by the arithmetic unit of the imaging device, the commands cause the imaging device to carry out an imaging method as described herein.

The computer program product may be configured as a computer program containing the commands. The computer program product may also be configured as a computer-readable storage medium, that stores a computer program containing the commands.

The features and combinations of features cited above in the description, along with the features and combinations of features cited below in the description of the figures and/or features and combinations of features shown alone in the figures may be used not only in the combination specified in each case, but also in other combinations, without departing from the framework of the invention. Embodiments and combinations of features are also to be regarded as disclosed that do not have all features of an originally formulated independent claim and/or that go beyond or deviate from the combinations of features set out in the back-references of the claims.

DETAILED DESCRIPTION

Figure 1:
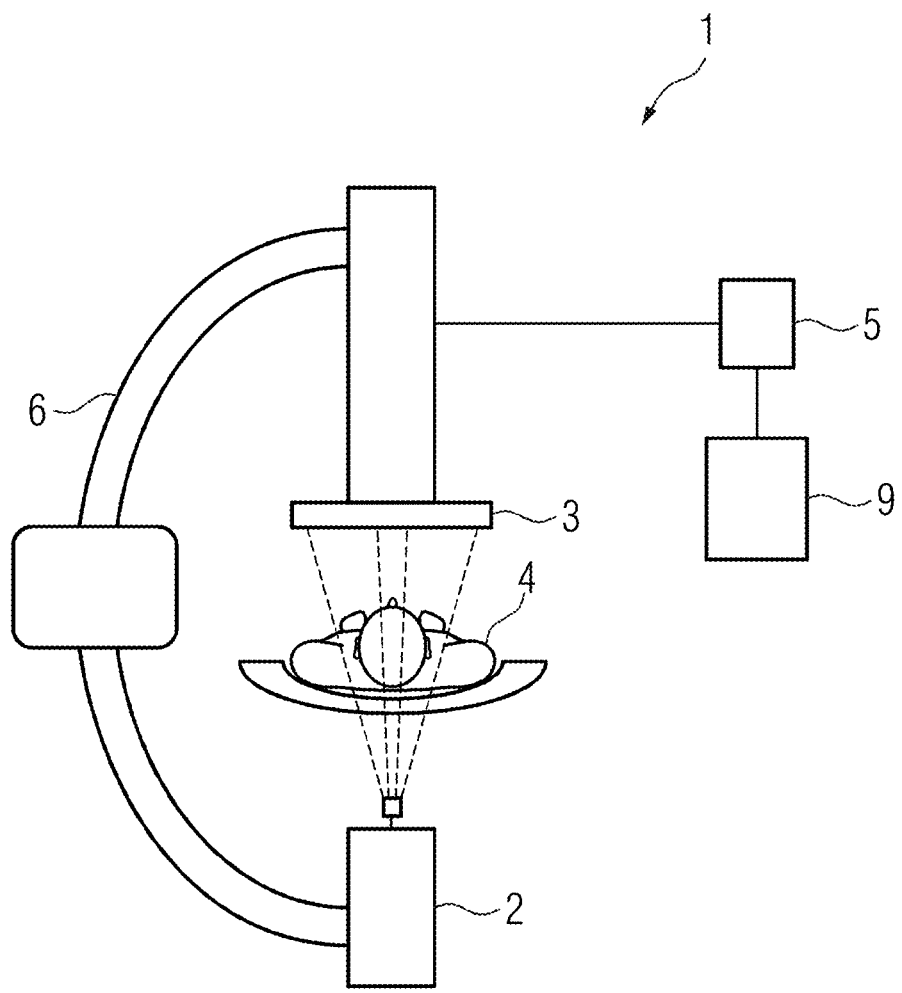
FIG. 1 depicts a schematic representation of an embodiment of an imaging device.

FIG. 1 schematically represents an embodiment of an imaging device 1 that for example is configured as an X-ray imaging device. Represented in the example in FIG. 1 is a configuration of the X-ray imaging device in accordance with the principle of a C-arm device with a rotatable and moveable C-arm 6, that may be correspondingly rotated and moved in order to image an object 4 to be imaged from different directions, in other words with different recording angles. An imaging device 1 in accordance with the improved concept may however also be structured in accordance with other configurations. For example, embodiments are not restricted to X-ray-based imaging methods.

The imaging device 1 in FIG. 1 contains an X-ray source 2, that is configured to generate X-ray radiation and to beam it in the direction of the object 4. A sensor 3 of the imaging device 1 is arranged on a side of the object 4 opposite the X-ray source 2, and for example contains a detector array consisting of photodiodes, in order to be able to detect X-ray quanta penetrating through the object 4. The sensor 3 may then transmit the corresponding detector signals for example to an arithmetic unit 5 of the imaging device 1 for further processing.

The imaging device 1 may for example be configured to carry out a rotation angiography method, for example on the basis of the principle of subtraction angiography. In this case the arithmetic unit 5 may for example generate a plurality of two-dimensional projections recorded from different angles and the arithmetic unit 5 may calculate a three-dimensional reconstruction from this.

The functionality of the imaging device 1 is explained in greater detail below with reference to different embodiments of an imaging method, for example with reference to FIG. 2 to FIG. 6.

Figure 2:
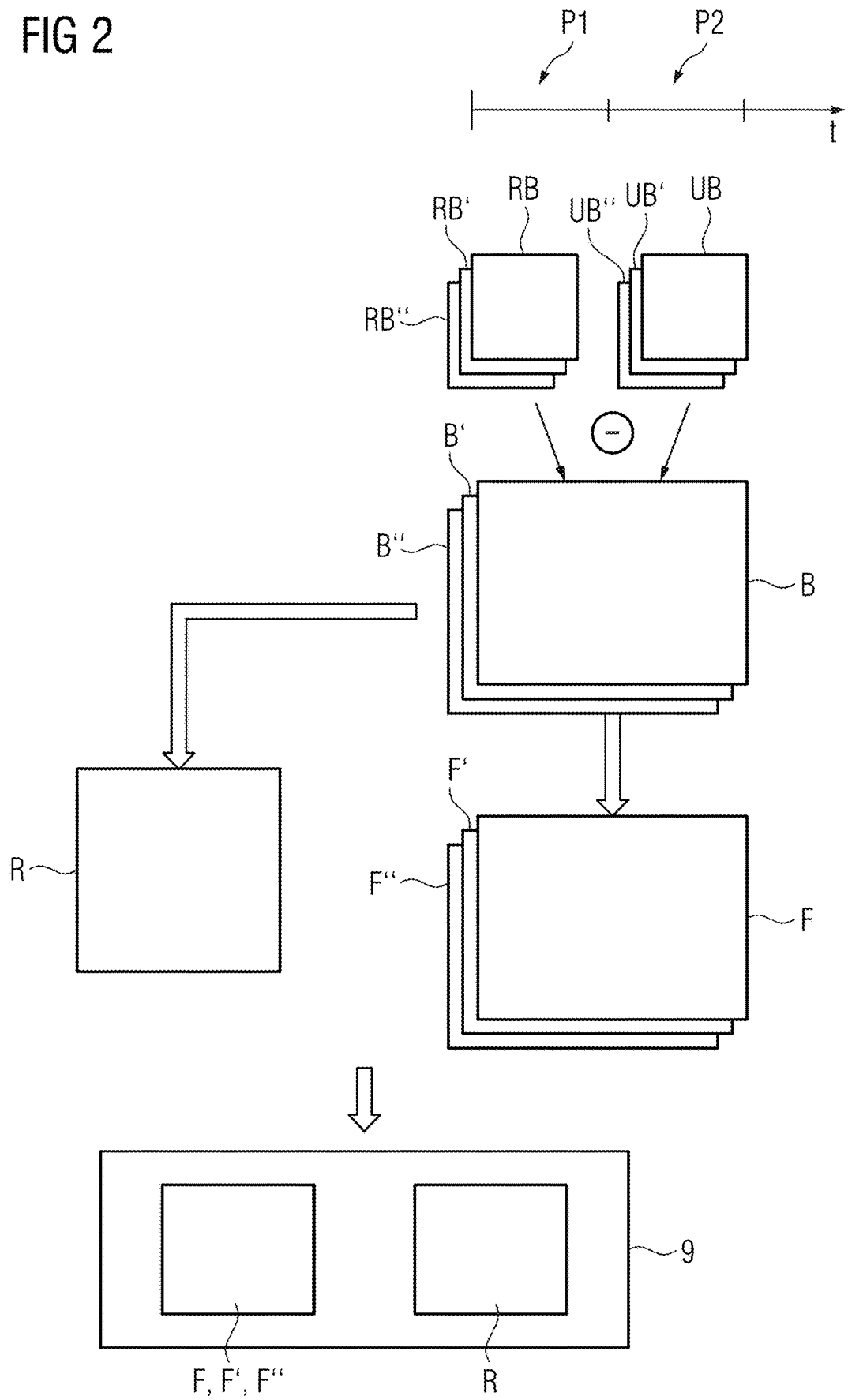
FIG. 2 depicts a schematic flow chart of an embodiment of an imaging.

FIG. 2 schematically depicts an embodiment of an imaging method that is configured as a rotation angiography method on the basis of the principle of subtraction angiography.

A time bar is depicted in an upper region of FIG. 2, and schematically represents two recording phases P1, P2 as a function of the time t. In this case the recording phases P1, P2 need not follow one another directly.

In a first phase P1 for example a plurality of reference images RB, RB', RB" of a region of the object 4 is generated, that in each case represents a vessel structure 7 (see FIG. 5) and a corresponding tissue environment of the vessel structure 7. The reference images RB, RB', RB" may also be referred to as masks. The different reference images RB, RB', RB" are in this case generated with different recording angles using the above-described functionality of the C-arm 6.

In a second phase P2 following on from the first phase P1 an associated examination image UB, UB', UB" with the same recording angle in each case is generated for each of the reference images RB, RB', RB". The examination images UB, UB', UB" in this case represent the same region of the object 4 as the reference images RB, RB', RB". However, whereas no contrast agent is used for the generation of the reference images RB, RB', RB", the examination images UB, UB', UB" may be generated with the use of a contrast agent, in other words as contrast agent images.

The contrast agent is for example introduced into the vessel structure 7 in the course of the second phase P2 or between the first phase P1 and the second phase P2, so that the examination images UB, UB', UB" in each case image the vessel structure 7 in an enhanced manner. Depending on the contrast agent used and on the processing of the resulting images, the vessel structure 7 may be represented as lighter or darker than the surrounding tissue. However, the administration of the contrast agent itself is in this case not to be regarded as part of the method.

Additionally, the examination images UB, UB', UB", in contrast to the reference images RB, RB', RB", image a device 8 (see FIG. 5) that was introduced into the object 4, for example into the vessel structure 7, after the generation of the reference images RB, RB', RB". The introduction of the device 8 into the object 4 or the movement of the device 8 into the object 4 is in this case however not to be regarded as part of the method in accordance with the improved concept. The examination images UB, UB', UB" hence represent both the vessel structure 7 and if appropriate the surrounding area and the device 8.

The device 8 may be an object that has a higher radio-opaqueness than the surrounding tissue. Depending on the processing of the output images the device 8 may hence be represented for example as darker than the surrounding tissue. The device 8 may for example include a metal, for example platinum, stainless steel or gold. The device 8 may fulfill different functions. For example, the device 8 may be part of a vessel catheter, a guidewire, or a part thereof, a part of a vessel prothesis or of a stent, a marker and so on. The device 8 may however also include a material, such as for example $CO_2$, for example dry ice, that is less radio-opaque compared to the surrounding area.

The arithmetic unit 5 combines each of the reference images RB, RB', RB" with the respective associated examination image UB, UB', UB" that was generated with the same recording angle, to obtain corresponding images B, B', B", also referred to as subtraction images or superimposition images. The combination of a reference image RB, RB', RB" with the associated examination image UB, UB', UB" may for example include a respective registration. In addition, the combination includes a subtraction of the respective reference image RB, RB', RB" from the associated examination image UB, UB', UB" or vice versa or of the corresponding registered images. In addition, the combination may include a further processing of the subtracted images. In other words, an image B may be expressed as B=P(UB−RB), wherein P represents any processing function.

Figure 5:
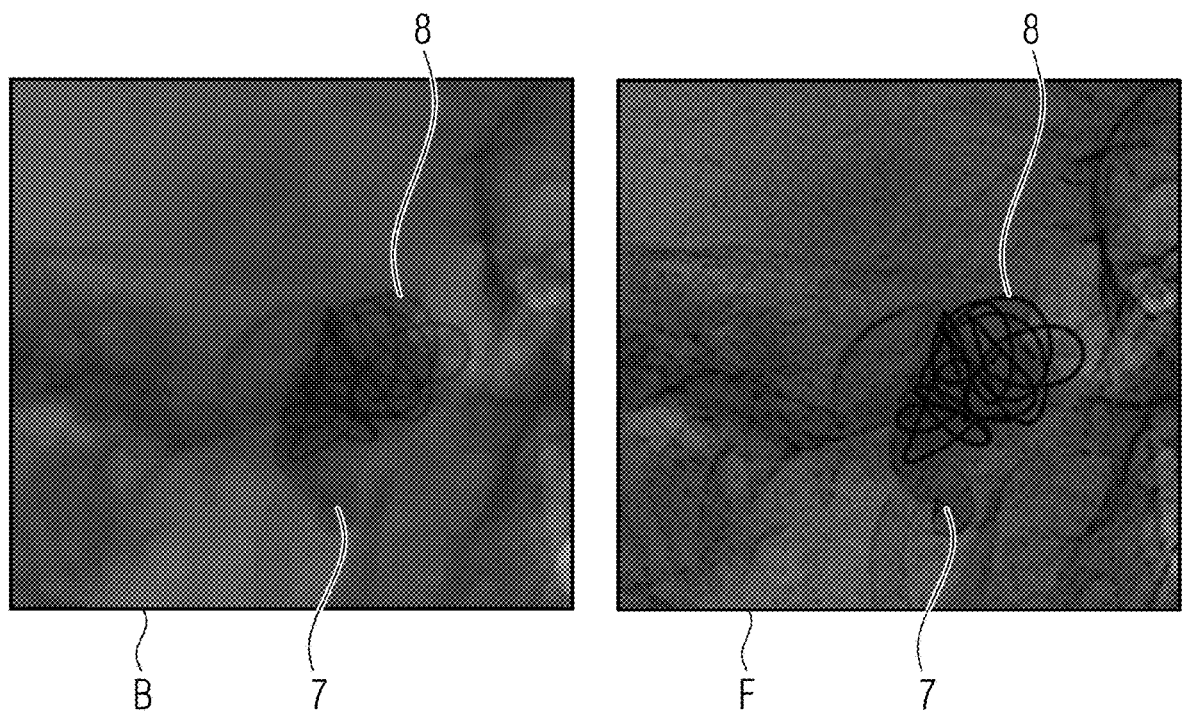
FIG. 5 depicts an image and a filtered image in accordance with an embodiment of an imaging method.

Normally the selection of the contrast agent and the processing of the images RB, RB', RB", UB, UB', UB" takes place such that the images B, B', B" represent the device 8 as darker than the tissue environment and for example darker than the vessel structure 7 (see FIG. 5). However, this is not necessarily the case.

The arithmetic unit 5 applies a local asymmetrical contrast amplification algorithm to each of the images B, B', B", to obtain respective filtered images F, F', F" as a result.

Each of the images B', B', B" is in this case formed by a plurality of pixels, that in each case correspond to an intensity value. The spatial position of each pixel may be specified by corresponding two-dimensional spatial coordinates. The functionality of the asymmetrical contrast amplification algorithm is represented by way of example in FIG. 3 to FIG. 6.

Figure 3:
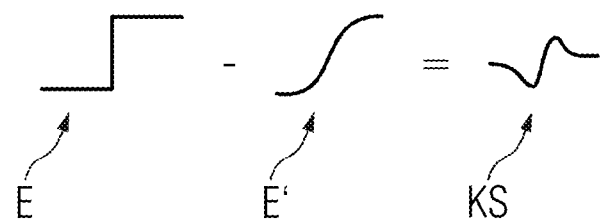
FIG. 3 depicts a schematic representation of the processing of intensity values in accordance with an embodiment of an imaging method.

FIG. 3 represents the generation of a contrast image on the basis of an input image. The input image may in this case correspond to one of the images B, B', B" or to an image dependent thereon. FIG. 3 represents an input signal E that as a schematic spatial characteristic corresponds to the intensity values in a region of the input image. The input signal E has a more or less steep step, that corresponds to the transition from a less radio-opaque material to a more radio-opaque material, for example a transition from tissue to the device 8. The arithmetic unit 5 generates a spatially blurred signal E', that may also be referred to as a soft signal, for example by convolution of the input signal E or of the entire input image with a Gaussian filter or a box kernel filter. Alternatively, a multiscalar filter approach may also be used for example. In this case a size of a filter kernel, in other words ultimately the size of the local surrounding area, may be parameterizable, for example by the user. Thus, optimized results may be achieved for different dimensions of the relevant objects, namely of the device 8 and/or of the vessel structure 7.

The blurred input signal E' is then subtracted from the input signal E, for example by the arithmetic unit 5, to generate a contrast signal KS. Alternatively, the process may be understood such that a blurred input image is subtracted from the input image in order to generate a contrast image.

Figure 4:
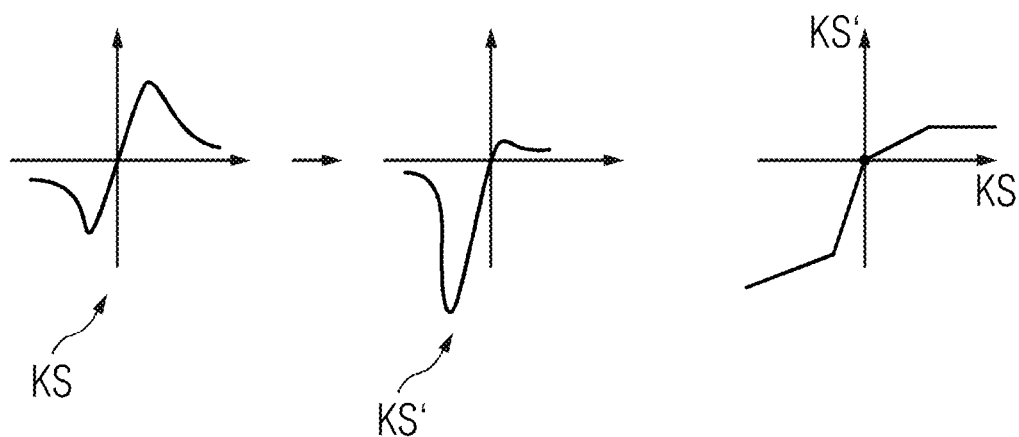
FIG. 4 depicts a schematic representation of the processing of intensity values in accordance with an embodiment of an imaging method.

The contrast signal KS or the contrast image is modified asymmetrically by the arithmetic unit, as is represented in FIG. 4. As a result, a modified contrast signal KS' or a corresponding modified contrast image is obtained.

Since in X-ray images typically more radio-opaque materials are used as devices, for example guidewires, stents, platinum markers, iodine and so on, these are contained in the input image with a negative or dark contrast compared to the surrounding area. The contrast signal KS may therefore be processed by the modification such that positive, in other words bright, values in the contrast signal KS are attenuated and negative, in other words dark, values in the contrast signal KS are amplified. This may be achieved for example by a parameterizable look-up table or another predefined function, as is sketched for example at the far right in FIG. 4.

The modified contrast signal KS' is then superimposed with the input image E, for example both of them are summed. Accordingly, dark parts in the input image are locally amplified by the application of the asymmetrical contrast amplification algorithm, in other words the brightness thereof is further reduced, whereas bright parts are locally not amplified or are amplified less than the dark parts.

In certain embodiments the brighter values may also be amplified and the darker values suppressed in the contrast signal KS. This may be advantageous to differentiate less dense materials, such as for example $CO_2$, more strongly from the surrounding area.

By way of example an image B is represented on the left in FIG. 5, and to the right thereof the corresponding filtered image F'. In comparison the device 8 in the superimposition image RMB, in which the local asymmetrical contrast amplification algorithm was employed, may be seen more clearly.

The clearer enhancement of the device 8 may be amplified further if the modified contrast signal KS' in different forms of embodiment is weighted with a degree of the local gradient field strength. The local gradient field strength may in this case for example be calculated via a Sobel operator.

Figure 6:
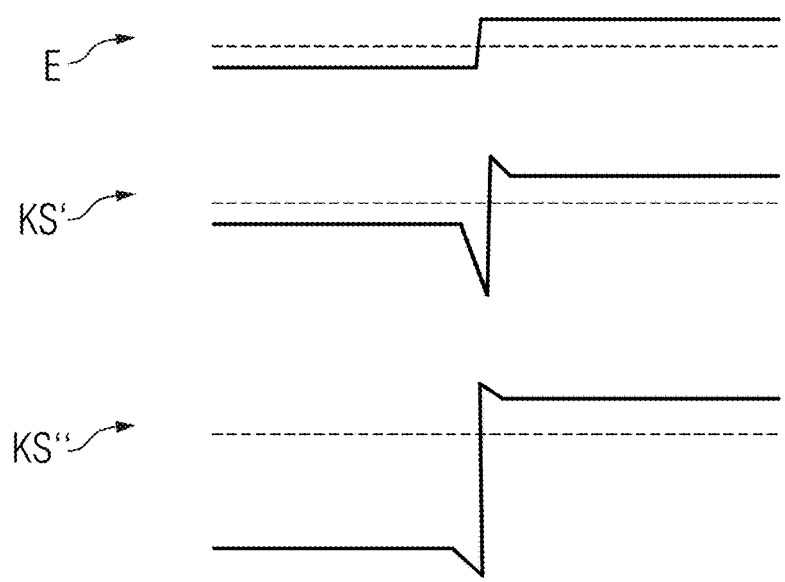
FIG. 6 depicts a schematic representation of the effect of an asymmetrical local contrast amplification algorithm on the human visual perception.

The particular effect of the asymmetrical local contrast amplification algorithm, for example compared to conventional local or global contrast amplification algorithms, is schematically represented in FIG. 6. The input signal E and the modified contrast signal KS', as described in respect of FIG. 3 and FIG. 4, are represented here. The human perception of adjoining image regions of different brightness is deceived by the asymmetrical exaggeration at the border, as is the case in the contrast signal KS', in line with a variant of the so-called Cornsweet effect, such that the average brightness difference appears greater to the left and right of the border than it actually is. In other words, the darker region will apparently be darkened even more strongly and in fact not just directly at the border. The resulting perceived characteristic KS" of the brightness is likewise represented at the bottom in FIG. 6. This effect is exploited in order to enhance relevant regions in the filtered images F, F', F" even more strongly.

The filtered images F, F', F" may then be displayed on the display device 9 one after the other, for example in the sequence of the recording angles, with a defined, if appropriate changeable, image rate. As a result, the effect of a three-dimensional representation, for example of the device 8 in the object 4, may be achieved.

In addition to the filtered images F, F', F" the arithmetic unit 5 may calculate a three-dimensional reconstruction R from the unfiltered images B, B', B". The reconstruction R may advantageously be displayed simultaneously to the chronologically dynamic representation of the filtered images F, F', F" on the display device 9 or a further display device (not shown). The user may then, preferably at a glance, acquire both the two-dimensional filtered images F, F', F" and the three-dimensional reconstruction R. It has been shown that in this way the information given by the filtered images F, F', F" and the reconstruction R may be recorded extremely effectively and efficiently by the user.

In respect of the figures, it has for example been described that the contrast amplification algorithm is applied to the subtraction images. It is however likewise possible analogously to apply the contrast amplification algorithm to the examination images, in order to save computing time and examination time.

Furthermore, it is possible to apply the contrast amplification algorithm just to parts of the subtraction images or of the examination images. To this end it is possible for a region of interest to be identified manually or for example with the help of trained models, and for only this to be filtered accordingly. Thus, the computing effort may be correspondingly reduced.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. An imaging method comprising:
    generating, by an imaging device, an image that includes a vessel structure of an object to be imaged, a device arranged in the object, or the vessel structure and the device;
    generating, by an arithmetic unit, a filtered image by applying a local asymmetrical contrast amplification algorithm to the image, wherein applying the local asymmetrical contrast amplification algorithm comprises:
        generating a blurred input image on the basis of an input image dependent on the image;
        generating a contrast image by subtraction of the blurred input image from the input image, wherein the contrast image is modified locally asymmetrically in respect of a local intensity threshold value, wherein for the modification of the contrast image an intensity value of an image point of the contrast image is reduced by a degree of reduction if the intensity value of the image point of the contrast image is smaller than the intensity threshold value or the intensity value of the image point of the contrast image is not increased or is increased by a lesser degree of increase compared to the degree of reduction if the intensity value of the image point of the contrast image is greater than the intensity threshold value;
        generating a contrast-amplified image by superimposition of the input image with the modified contrast image; and
    displaying, by a display device, the filtered image to a user of the imaging device.

2. The imaging method of claim 1, further comprising:
    generating a reference image and an examination image, wherein the reference image does not represent the device arranged in the object and the examination image represents the device arranged in the object;
    wherein the image is generated as a subtraction image of the examination image and of the reference image.

3. The imaging method of claim 2, wherein the examination image is generated using a contrast agent and the reference image is generated without using the contrast agent.

4. The imaging method of claim 1, further comprising:
    generating, by the imaging device, a reference image without using a contrast agent and an examination image using the contrast agent, wherein the examination image represents the vessel structure;
    wherein the image is generated as a subtraction image of the examination image and of the reference image.

5. The imaging method of claim 1, further comprising:
    generating, by the imaging device, a plurality of further images, wherein each of the plurality of further images includes the vessel structure, the device arranged in the object, or the vessel structure and the device, wherein the image and each of the plurality of further images are generated with different recording angles;

wherein the contrast amplification algorithm is applied to each of the plurality of further images by the arithmetic unit to generate a respective further filtered image; and wherein the further filtered images are displayed to the user by the display device.

6. The imaging method of claim 5, wherein the filtered image and the further filtered images are displayed one after the other, so that at each point in time either the filtered image or precisely one of the further filtered images is displayed.

7. The imaging method of claim 5, further comprising:
generating a three-dimensional reconstruction on the basis of the image and the plurality of further images; wherein the reconstruction is displayed by the display device.

8. The imaging method of claim 7, wherein the reconstruction is generated independently of the filtered image and independently of the further filtered images.

9. The imaging method of claim 1, wherein the local intensity threshold value is determined as an average intensity value of a predefined surrounding area of an image point of the input image.

10. The imaging method of claim 1, wherein by application of the contrast amplification algorithm, intensity values below a local intensity threshold value are reduced or intensity values above the local intensity threshold value are increased; wherein the contrast amplification algorithm works asymmetrically in respect of the local intensity threshold value.

11. The imaging method of claim 10, wherein the contrast amplification algorithm reduces intensity values below the local intensity threshold value by a degree of reduction and does not increase intensity values above the local intensity threshold value or increases them by a lesser degree of increase compared to the degree of reduction.

12. An imaging device comprising:
an imaging modality configured to generate at least one sensor dataset that relates to a vessel structure of an object to be imaged, a device arranged in the object, or the vessel structure and the device;
an arithmetic unit configured, on the basis of the at least one sensor dataset, to generate an image that includes the vessel structure, the device, or the vessel structure and the device; the arithmetic unit further configured to generate a filtered image by applying a local asymmetrical contrast amplification algorithm to the image, wherein applying the local asymmetrical contrast amplification algorithm comprises:
generating a blurred input image on the basis of an input image dependent on the image;
generating a contrast image by subtraction of the blurred input image from the input image, wherein the contrast image is modified locally asymmetrically in respect of a local intensity threshold value, wherein for the modification of the contrast image an intensity value of an image point of the contrast image is reduced by a degree of reduction if the intensity value of the image point of the contrast image is smaller than the intensity threshold value or the intensity value of the image point of the contrast image is not increased or is increased by a lesser degree of increase compared to the degree of reduction if the intensity value of the image point of the contrast image is greater than the intensity threshold value; and
generating a contrast-amplified image by superimposition of the input image with the modified contrast image; and
a display device coupled to the arithmetic unit and configured to display of the filtered image to a user of the imaging device.

13. The imaging device of claim 12, wherein the imaging modality is further configured to generate a reference image and an examination image, wherein the reference image does not represent the device arranged in the object and the examination image represents the device arranged in the object; and
wherein the arithmetic unit is configured to generate the image as a subtraction image of the examination image and of the reference image.

14. The imaging device of claim 13, wherein the examination image is generated using a contrast agent and the reference image is generated without using the contrast agent.

15. The imaging device of claim 12, wherein the imaging modality is further configured to generate a reference image without using a contrast agent and an examination image using the contrast agent, wherein the examination image represents the vessel structure; and
wherein the arithmetic unit is configured to generate the image as a subtraction image of the examination image and of the reference image.

16. A non-transitory computer implemented storage medium that stores machine-readable instructions executable by at least one processor, the machine-readable instructions comprising:
acquiring an image that includes a vessel structure of an object to be imaged, a device arranged in the object, or the vessel structure and the device;
generating a filtered image by applying a local asymmetrical contrast amplification algorithm to the image, wherein applying the local asymmetrical contrast amplification algorithm comprises:
generating a blurred input image on the basis of an input image dependent on the image;
generating a contrast image by subtraction of the blurred input image from the input image, wherein the contrast image is modified locally asymmetrically in respect of a local intensity threshold value, wherein for the modification of the contrast image an intensity value of an image point of the contrast image is reduced by a degree of reduction if the intensity value of the image point of the contrast image is smaller than the intensity threshold value or the intensity value of the image point of the contrast image is not increased or is increased by a lesser degree of increase compared to the degree of reduction if the intensity value of the image point of the contrast image is greater than the intensity threshold value;
generating a contrast-amplified image by superimposition of the input image with the modified contrast image; and
displaying the filtered image to a user of an imaging device.

* * * * *